United States Patent
Ur et al.

(10) Patent No.: US 8,397,104 B2
(45) Date of Patent: Mar. 12, 2013

(54) CREATION OF TEST PLANS

(75) Inventors: Shmuel Ur, Shorashim (IL); Aviad Zlotnick, Mitzpe Netofah (IL)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 12/820,156

(22) Filed: Jun. 22, 2010

(65) Prior Publication Data

US 2010/0274520 A1 Oct. 28, 2010

Related U.S. Application Data

(63) Continuation-in-part of application No. 12/427,773, filed on Apr. 22, 2009.

(51) Int. Cl.
*G06F 11/00* (2006.01)
(52) U.S. Cl. .............................. 714/32; 714/25; 714/47.1
(58) Field of Classification Search ..................... 714/25, 714/32
See application file for complete search history.

(56) References Cited

U.S. PATENT DOCUMENTS

| | | | |
|---|---|---|---|
| 6,530,054 B2 | 3/2003 | Hollander | |
| 6,577,982 B1 | 6/2003 | Erb | |
| 6,647,513 B1 | 11/2003 | Hekmatpour | |
| 6,742,166 B2 | 5/2004 | Foster et al. | |
| 6,928,393 B2 * | 8/2005 | Czerwonka | 702/186 |
| 7,389,215 B2 | 6/2008 | Azatchi et al. | |
| 7,636,871 B1 | 12/2009 | Blue et al. | |
| 2003/0046613 A1 * | 3/2003 | Farchi et al. | 714/38 |
| 2004/0260516 A1 | 12/2004 | Czerwonka | |
| 2005/0278576 A1 * | 12/2005 | Hekmatpour | 714/37 |
| 2007/0006041 A1 * | 1/2007 | Brunswig et al. | 714/38 |
| 2007/0079280 A1 | 4/2007 | Schultz et al. | |
| 2007/0168727 A1 * | 7/2007 | Fournier et al. | 714/25 |
| 2008/0255822 A1 * | 10/2008 | Adir et al. | 703/21 |

OTHER PUBLICATIONS

FoCuS: A tool that implements the functional coverage methodology, providing detailed coverage information and improving testing. Date Posted: Apr. 26, 1999. URL: http://www.alphaworks.ibm.com/tech/focus.
Andrea Calvagna et al, "IPO-s: incremental generation of combinatorial interaction test data based on symmetries of covering arrays", 2009. URL: http://ieeexplore.ieee.org/stamp/stamp.jsp?arnumber=4976366.
Y. Ledru et al, "Filtering TOBIAS combinatorial test suites", 2004. URL: http://membres-lig.imag.fr/ledru/Publications/LedruFASE04.pdf.
Christine Cheng et al, "Generating Small Combinatorial Test Suites to Cover Input-Output Relationships", 2003. URL: http://portal.acm.org/citation.cfm?id=1295074.1295085&coll=GUIDE&dl=GUIDE&CFID=78184058&CFTOKEN=27297035.
Coverage Directed test Generation Source: http://www.haifa.ibm.com/projects/verification/ml_cdg/index.html.

* cited by examiner

*Primary Examiner* — Scott Baderman
*Assistant Examiner* — Sarai Butler
(74) *Attorney, Agent, or Firm* — Ziv Glazberg; Glazberg & Applbaum Co.

(57) ABSTRACT

Test plan to be utilized in a testing phase may be generated based on an initial test plan. A functional coverage model may be derived from the initial test plan. Modifications to the test plan may be automatically determined based on predetermined rules and parameters. Restrictions over possible combinations of values may be determined based on analysis of uncovered test activities in the initial test plan. Restrictions may be determined based on values of test activities in the initial test plan. Restrictions and modifications determined according to the disclosed subject matter may be indicated to a user for confirmation thereof.

25 Claims, 3 Drawing Sheets

CREATION OF TEST PLANS

CROSS REFERENCE TO RELATED APPLICATIONS

This application is a continuation in part of prior patent application Ser. No. 12/427,773, filed Apr. 22, 2009, the content of which is hereby incorporated by reference.

BACKGROUND

The present disclosure relates to testing coverage in general, and to increasing functional coverage of a testing phase, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

During the testing phase, a sample of all possible behaviors of the computerized device is inspected. Modern testing techniques focus on testing different behaviors, by measuring coverage of the executed tests. Functional coverage is one such method. It is designed to measure amount, portion or a similar metric of tests that examined predetermined functional behaviors. Once functional coverage is measured, quality assurance (QA) personnel may design additional tests to examine untested behaviors.

Another testing technique is Combinatorial Test Design (CTD), in which a model of possible behaviors of the computerized device is formulated and is used to generate tests that are configured to cover a subset of all possible behaviors. For example, a model may define possible configurations of a system comprising an operating system (OS), a web-browser, a mail server and a central processing unit (CPU). The OS may be, for example, Linux, Microsoft Windows XP or Microsoft Windows Vista. The web-browser may be, for example, Mozilla Firefox, Google Chrome, Microsoft Internet Explorer or Opera web browser. In a similar manner, there may be a predetermined number of mail servers and CPUs. A test of each possible combination of the above mentioned components may be created, however, in order to reduce the number of tests to be executed, a combinatorial test design may be applied. A model may define or characterize subsets of the entire test-space to cover. The model may additionally define a subset of the entire test-space that is invalid. For example, a known incompatibility between Linux OS with the Microsoft Internet Explorer web browser. Thus enabling generation of tests that are configured to cover a subset of all possible behaviors of the system. The model may be defined to cover a small subset of all possible behaviors, such that the small subset has predetermined properties that are deemed favorable by, for example, QA personnel.

SUMMARY

One exemplary embodiment of the disclosed subject matter is a method for generating a test plan, wherein the method is performed by a processor, the method comprising: obtaining a first test plan comprising a plurality of test requirements in respect to functional attributes of at least one test; determining a coverage model based on the first test plan; determining at least one uncovered characteristic based on the coverage model; based on the at least one uncovered characteristic, determining at least one restriction in respect to the coverage model; and determining a second test plan in accordance with the coverage model and based on the at least one restriction; whereby the first test plan is transformed to the second test plan.

Another exemplary embodiment of the disclosed subject matter is a computerized apparatus for generating a test plan, the computerized apparatus having a processor; the computerized apparatus comprising: a test plan obtainer configured to obtain a first test plan, wherein the first test plan comprises a plurality of test requirements in respect to an attribute of at least one test; a coverage model determinator configured to determine a coverage model based on the first test plan; an uncovered test requirement determinator configured to determine an uncovered test requirement based on the coverage model; a restriction determinator configured to determine an at least one restriction in respect to the functional coverage model based on the uncovered test requirement; and a test plan creator configured to determine a second test plan based on the coverage model and based on the at least one restriction determined by the restriction determinator.

Yet another exemplary embodiment of the disclosed subject matter is a method for generating a test plan, wherein the method is performed by a processor, the method comprising: obtaining a first test plan comprising a plurality of test requirements in respect to functional attributes of at least one test; determining a coverage model based on the first test plan; determining a coverage goals covered by the first test plan in respect to the coverage model generating a second test plan based upon the coverage model, wherein said generating is performed using a Combinatorial Test Design (CTD) method; the second test plan is configured to cover at least the coverage goals; determining at least one coverage goal covered by the second test plan and not covered by the first test plan; defining at least one restriction based upon the at least one coverage goal; generating a third test plan based upon the coverage model and the restriction; whereby the first test plan is transformed to the third test plan.

Yet another exemplary embodiment of the disclosed subject matter is a computer program product for generating a test plan, the product comprising: a computer readable medium; a first program instruction for obtaining a first test plan comprising a plurality of test requirements in respect to functional attributes of at least one test; a second program instruction for determining a coverage model based on the first test plan; a third program instruction for determining at least one uncovered characteristic based on the coverage model; a fourth program instruction for determining at least one restriction in respect to the coverage model based on the at least one uncovered characteristic; a fifth program instruction for determining a second test plan in accordance with the coverage model and based on the at least one restriction; and wherein said first, second, third, fourth and fifth program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
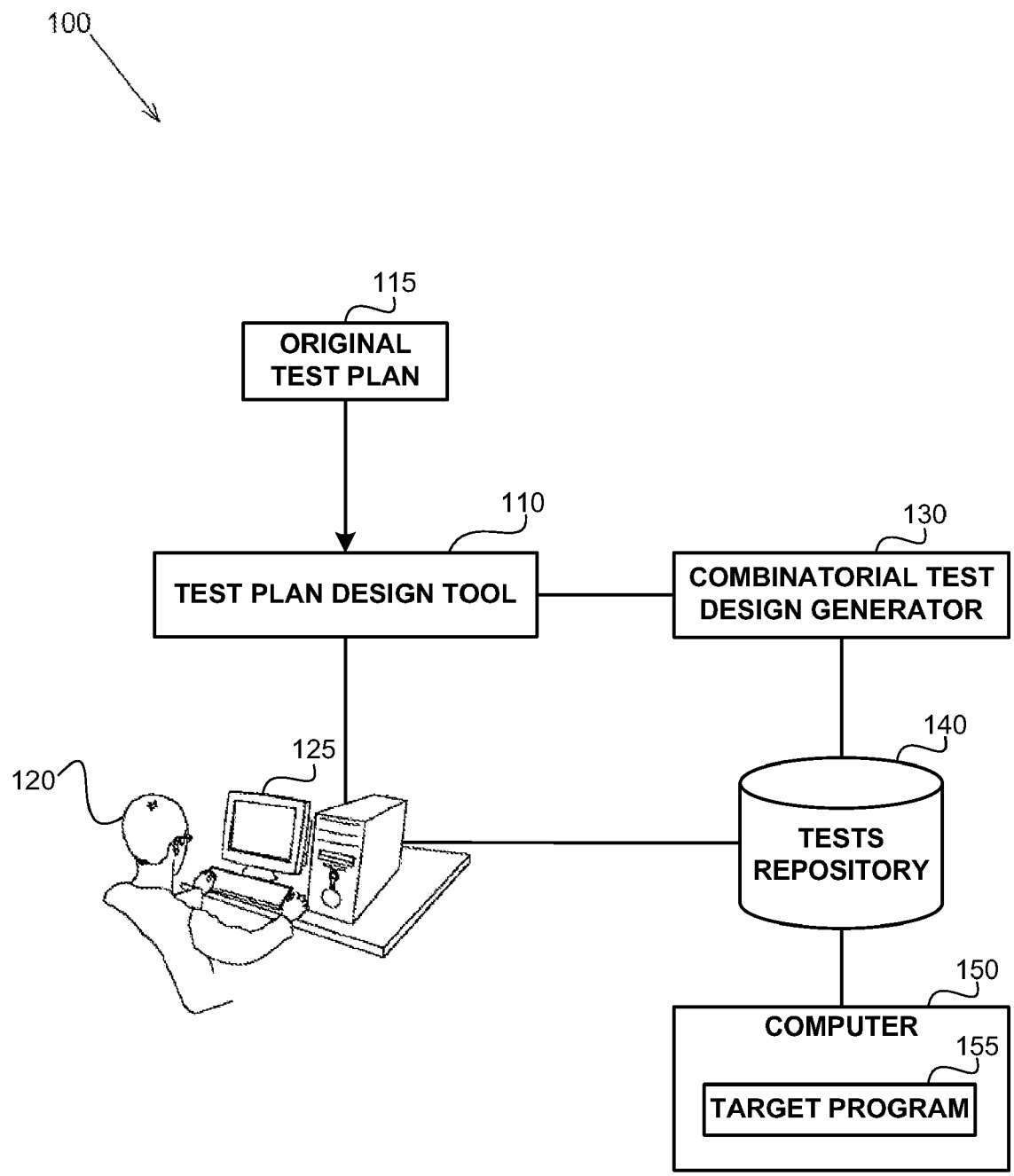
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to is function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide a test plan for performing a test. Another technical problem dealt with by the disclosed subject matter is to provide a test plan based on an initial test plan, wherein the test plan has a better coverage in respect to the initial test plan in view of a functional coverage model. Yet another technical problem is to automatically determine possible restrictions on combinations of attributes to the functional coverage model such as to assist a user in reducing the size of the test plan.

One technical solution is to utilize an initial test plan prior to executing a test or prior to writing tests, as to identify tasks that are uncovered by the test plan. Another technical solution is to provide a user with a set of uncovered tasks, thus enabling the user to identify illegal tasks that should be prohibited by a restriction. Yet another technical solution is to analyze the test plan to automatically determine possible restrictions. In one exemplary embodiments, a set of columns may have a predetermined correlation, such as only one column having a "TRUE" value, having only a limited number of combination of values or the like. The set of columns may be automatically identified and possible restrictions may be suggested or utilized. Yet another technical solution is to automatically identify exceptional tasks, such as tasks in which two columns out of the set of columns are associated with a "TRUE" value and suggest to a user that their value may be erroneous. Yet another solution is to utilize CTD to determine missing tests in respect to the test plan, to generate a new test plan from scratch or the like.

One technical effect of utilizing the disclosed subject matter is transforming a test plan to an improved test plan, the improved test plan may be expected to have better coverage than the test plan. Another technical effect is automatically generating suggestions to a user based on a functional coverage model that may be substantially large, as to enable to user to determine restrictions in a relatively easy manner. Yet another technical effect is to provide for an evaluation of the test plan as to its quality, and/or solicit all the restrictions in a way which is relatively easy for the tester to reply to.

Referring now to FIG. 1 showing a computerized environment in which the disclosed subject matter is used, in accordance with some exemplary embodiments of the subject matter.

A computerized environment 100 may comprise a test plan design tool 110 useful for planning a test plan. A test plan may be a list of testing activities, also referred to as test requirements. Each activity may be connected to a separate test. A test activity may be defined using values of functional attributes associated with a System Under Test (SUT), such as for example a software component utilized by the SUT, a hardware component of a computer 150 of the SUT, an operating system executing a target program 155 of the SUT, or the like. A test plan may be utilized by a user 120, such as a tester, a QA professional, a developer or the like, to create tests, either manually by enforcing the test requirements or automatically by generating a test which complies with the test requirements.

The test plan design tool 110 may utilize an original test plan 115. The original test plan 115 may be a test plan defined manually by a user, a test plan based on tests that were already created, a test plan based on tests to be created in the future or the like. The test plan does not comprise the tests themselves, rather the test requirements associated with the tests.

The test plan design tool 110 may produce a test plan (not shown) based on the original test plan 115. The test plan design tool 110 may advise the user 120, utilizing a Man-Machine-Interface 125, such as a terminal, to define the possible tests of the SUT.

A Combinatorial Test Design generator 130 may be utilized to generate the test plan based on a functional model defined by the test plan design tool 110 and restrictions provided by the user 120 or by the test plan design tool 110. In some exemplary embodiments, the test plan design tool 110 may automatically determine restrictions on the functional model of the SUT based on the original test plan 115 and based on predetermined rules, parameters, and the like. The test plan design tool 110 may provide the user 120 with the determined restrictions for verification of their correctness. The test plan design tool 110 may modify the functional coverage model of the original test plan to provide for a relatively simplified functional coverage model. For example, the test plan design tool 110 may determine that a set of attributes may be unified as their content may be correlated. An appropriate restriction may be determined in respect to the original functional coverage model, or the functional coverage model may be modified to consist of less attributes and to include a new column which represents the same information as the set of attributes.

The user 120 may write, design or otherwise create tests according to the test plan and store them in a repository 140. The test repository 140 may be in a storage device, such as a hard disk, a storage server, memory or the like. Tests from the repository 140 may be utilized to test the target program 155 executed by the computer 150. The target program 155 may be a computer program designed in a programming language such as C, Assembly, Java or the like. In some exemplary embodiments, the tests repository 140 may comprise tests according to the original test plan 115 prior to the utilization of the disclosed subject matter. The entity creating tests based on the test plan provided by the test plan design tool 110, be it the test plan design tool 110, the CTD generator 130, the user 120 or another entity, may add to the tests already present in the tests repository 140 in order to comply with the test plan. The entity may alternatively overwrite, purge, or delete the tests previously retained in the tests repository 140, and replace them or add to them a set of tests complying with the test plan on its own.

Figure 2:
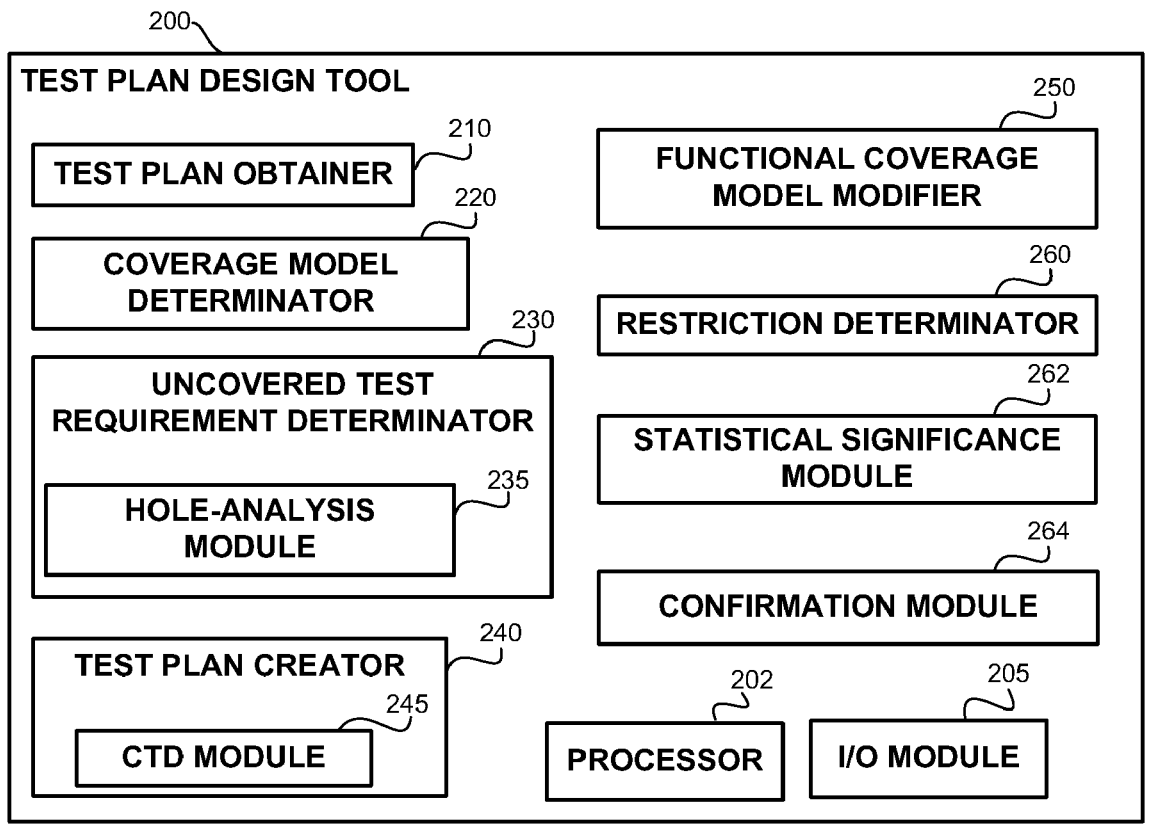
FIG. 2 shows a block diagram of a test plan design tool, in accordance with some exemplary embodiments of the disclosed subject matter.

Referring now to FIG. 2 showing a test plan design tool in accordance with some exemplary embodiments of the disclosed subject matter. A test plan design tool 200, such as 110 of FIG. 1, may be configured to determine a second test plan based on a first test plan, such as the original test plan 115 of FIG. 1. In some exemplary embodiments, the second test plan may comprise a portion of the first test plan. In some exemplary embodiments, the second test plan may be determined such as not to necessarily include any portion of the first test plan.

In some exemplary embodiments, a test plan obtainer 210 may be configured to obtain the first test plan. The first test plan may be obtained from a user, such as 120 of FIG. 1, from a database, such as a file system, a storage device or the like, or from other sources. The first test plan may comprise a plurality of test requirements. Test requirements may be used to define functional attributes to be fulfilled by a test. In some exemplary embodiment, a test requirement may comprise values for functional attributes. In some exemplary embodiments, each test requirement may be covered by a different test. In other exemplary embodiments, a single test may cover multiple test requirements. The test plan obtainer 210 may utilize an I/O module 205 to obtain the first test plan.

In some exemplary embodiments, a coverage model determinator 220 may be configured to determine a functional coverage model based on the first test plan. The functional coverage model may comprise the functional attributes that are comprised by the test requirements of the test plan. The possible values of a functional attribute may be determined based on values associated with the functional attribute in the test requirements of the first test plan. For example, consider a test plan in which there are the following attributes: Browser, Operating System (OS) and Memory size. There may be for example four test requirements:
 1. Browser=Chrome; OS=Windows 7; Memory=512 MB;
 2. Browser=IE; OS=Windows 7; Memory=1 GB;
 3. Browser=Safari; OS=Mac OS; Memory=4 GB;
 4. Browser=Chrome; OS=Linux; Memory=8 GB.
The coverage model determinator 220 may determine a functional coverage of three attributes, where Browser may be assigned one of three values—Chrome (meaning, Google® Chrome), IE (meaning, Microsoft® Internet Explorer) and Safari (meaning, Apple® Safari); where OS may be assigned one of three values: Windows 7 (meaning, Microsoft® Windows 7), Mac OS (meaning, Apple® Mac OS) and Linux; and where the Memory may be either 512 MB, 1 GB, 4 GB or 8 GB.

In some exemplary embodiments, an uncovered test requirement determinator 230 may be configured to determine a test requirement that is not covered by the test plan. The uncovered test requirement may be a set of values to the attributes based on the functional coverage model that are not covered by the test plan. Referring to the aforementioned example, several combinations are not covered. For example, a test activity of Chrome, Windows 7, 4 GB is not covered; a test activity of IE, Linux, 512 MB is also uncovered. Some of the uncovered tasks should be covered, while others cannot be covered. For example, IE works only with the Windows OS, and will not work with either Linux or Mac OS.

In some exemplary embodiments, a hole-analysis module 235, may be utilized to determine "holes" in the coverage described by the first test plan. Holes of size 1 may be determined based on a value to an attribute that is not assigned in any test requirement in the first test plan. A hole of size 1 may be an outcome of a value to an attribute of the functional coverage model that was added on top of the functional coverage model determined by the coverage model determinator 220, such as for example by a user. A hole of size 2 may be determined based on a combination of two values never checked together in a single test activity. For example, OS=Linux and Browser=IE, is a hole of size 2 in respect to the exemplary test plan shown above. The hole-analysis module 235 may perform automatic analysis based on hole-analysis techniques that are known in the art. The hole-analysis module 235 may identify holes of different sizes, such as for example holes of size of up to three, based on rules, commands, user's input or the like.

In some exemplary embodiments, a restriction determinator 260 may be configured to determine one or more restrictions in respect to uncovered test requirements determined by the uncovered test requirement determinator 230. The restriction may be determined and provided to a user for confirmation, such as using a confirmation module 264. In case of a user doesn't confirm the restriction, a test requirement may be missing from the first test plan, and may be determined by the test plan design tool 200.

In some exemplary embodiments, the confirmation module 264 may solicit a user, such as 120 of FIG. 1, to determine whether or not a restriction is correct or not. The user may be aware of technical restrictions that would explain why the restriction is correct, such as the fact the IE browser can only work with Windows OS, and therefore a restriction of Browser=IE and OS=Linux may be confirmed. In some exemplary embodiments, the user may be provided possible restrictions and in a relatively easy manner determine the correct restrictions based on holes in the first test plan. In case a is suggested restriction is incorrect, the test plan design tool 200 may create a second test plan that will cover the uncovered test requirement. The confirmation module 264 may utilize the I/O module 205 to provide a suggestion to the user, and/or to receive the user's response to the suggestion.

In some exemplary embodiments, a user may provide an indication that the restriction is correct or incorrect. In some exemplary embodiments, the user may further provide a don't care indication that may indicate that the restriction is incorrect (i.e., a coverage task excluded by the restriction may be covered by the SUT) but coverage of the coverage task is an optional coverage task and may or may not be covered. The don't care indication may be utilized by a CTD module 245 to enable generation of a relatively small number test requirements. The CTD module 245 may determine a test plan that either covers or doesn't cover the optional coverage task. In some cases, by excluding a coverage task, the number of test requirements required to cover the coverage model increases, while in other cases, by including a coverage task the number of test requirements to cover the coverage model increases. The CTD module 245 may provide a test plan that either covers or doesn't cover the optional coverage task, such as to provide a smaller number of test requirements.

In some exemplary embodiments, the restriction determinator 260 may determine additional restrictions based on possible relations between attributes of the functional coverage model. Consider a coverage model comprising attributes of NY, LA, Paris and TLV which are assigned either "Yes" or "No". In case that in almost all of the test requirements of first the test plan only one attribute is "Yes" and all the others are "No", then it may be concluded that the four attributes are correlated. Restrictions enforcing that only one attribute may be assigned a "Yes" value may be generated, and in some exemplary embodiments, suggested to the user for confirmation.

In some exemplary embodiments, there may be few test requirements that do not comply with this restriction, such as in which NY="Yes" and LA="Yes". The restriction determinator 260 may utilize a statistical significance module 262 configured to determine whether the number of such test requirements is statistically significant or not, as is known in the art. For example, consider there are 1000 test requirements that comply with this restriction, and 10 test requirements that do not comply with this restriction, it is likely that the 10 tests are an outcome of an error in designing the first test plan. Since the 10 tests may be considered statistically significant in respect to the set of 1010 tests activities, the restriction may be determined In one exemplary embodiment, a statistical significance may be determined as follows: let N be the number of test activities and K be the number of tests that satisfy the pertinent requirement, a score $(N-K)/sqrt(N)$ may be computed. The score gets lower as the number of tests activities that do not comply with the restriction is more statistically significant. A score less than one, or a similar threshold, may be considered sufficient to deduce that the sample is statistically significant and therefore may be an outcome of an error or mistake. Other computations of statistical significance may be performed.

In some exemplary embodiments, the disclosed subject matter may be utilized to determine sets of possible combinations of values to attributes based on their values in the first test plan. The restriction determinator 260 may utilize a generalized technique similar to that disclosed above regarding a single selection of an attribute from a set of attributes. In case the number of different combinations of values in all test requirements is significantly smaller than the number of combinations appearing in the first test plan, the restriction determinator 260 may determine that any repetitive combination, or combinations that appear a significant number of times are legal while other combinations may be flagged as possibly illegal combinations. A restriction may be determined by the restriction determinator 260 in respect to flagged combinations with or without user's confirmation.

In some exemplary embodiments, a Functional Coverage Model Modifier (FCMM) 250 may be configured to modify the functional coverage model determined by the coverage model determinator 220. The FCMM 250 may be configured to unify several attributes to a single attribute. In some exemplary embodiments, several single values attributes may be unified into a single attribute. For example, in respect to the exemplary NY, LA, Paris and TLV attributes, a single attribute ("City") may be utilized having four possible values: NY, LA, Paris and TLV. The FCMM 250 may unify a set of attributes having a relatively small number of possible combinations. The FCMM 250 may utilize the statistical significance module 262 or a similar module to determine statistical significance.

In some exemplary embodiments, the first test plan may comprise of descriptive attributes that may be omitted during functional coverage analysis. The FCMM 250 may comprise a descriptive attribute module (not shown) configured to identify such descriptive attributes and remove them from the functional coverage model. The descriptive attribute module of the FCMM 250 may determine that the number of different attribute values in an attribute is almost as large as the number of test requirements (i.e., almost each test requirement has a different value for the attribute). In such a case the attribute may be flagged as a descriptive attribute. In some exemplary embodiments, a user may be solicited to verify the determination. In some exemplary embodiments, a score of the function $(N-X)/sqrt(N)$ below a threshold, where N is the number of test activities in the first test plan, and X is the number of unique values of the attribute, may be considered as indicative to the attribute being descriptive. The computation of the score may be performed using a statistical significance module, such as 262. A threshold may be determined based on confidence level in the determination. For example, a threshold of 2.5 may be selected.

In some exemplary embodiments, a test plan creator 240 may be utilized to determine a second test plan in accordance with the functional coverage model and based on any restrictions that may be determined by the restriction determinator 260. The test plan creator 240 may utilize a CTD module 245, such as 130 of FIG. 1, to generate a set of test requirements that provides full coverage of the functional coverage model, based on the restrictions, in respect to hole of predetermined sizes. The CTD module 245 may be comprised by the test plan design tool 200 or, as is shown of FIG. 1, may be an external module. The CTD module 245 may generate the second test plan in addition to the first test plan (i.e., providing coverage of any holes not covered by the first test plan) or may generate the second test plan on its own to provide coverage to the functional coverage model without adding test requirements of the first test plan.

In some exemplary embodiments, the second test plan may be utilized in creating, either manually, automatically, or a combination thereof, of tests complying with the second test plan.

In some exemplary embodiments of the disclosed subject matter, the test plan design tool 200 may comprise an Input/Output (I/O) module 205. The I/O module 205 may be utilized to provide an output to and receive input from a user, such as 120 of FIG. 1.

In some exemplary embodiments, the optimization tool 200 may comprise a processor 202. The processor 202 may be a Central Processing Unit (CPU), a microprocessor, an electronic circuit, an Integrated Circuit (IC) or the like. The processor 202 may be utilized to perform computations required by the test plan design tool 200 or any of it subcomponents.

Figure 3:
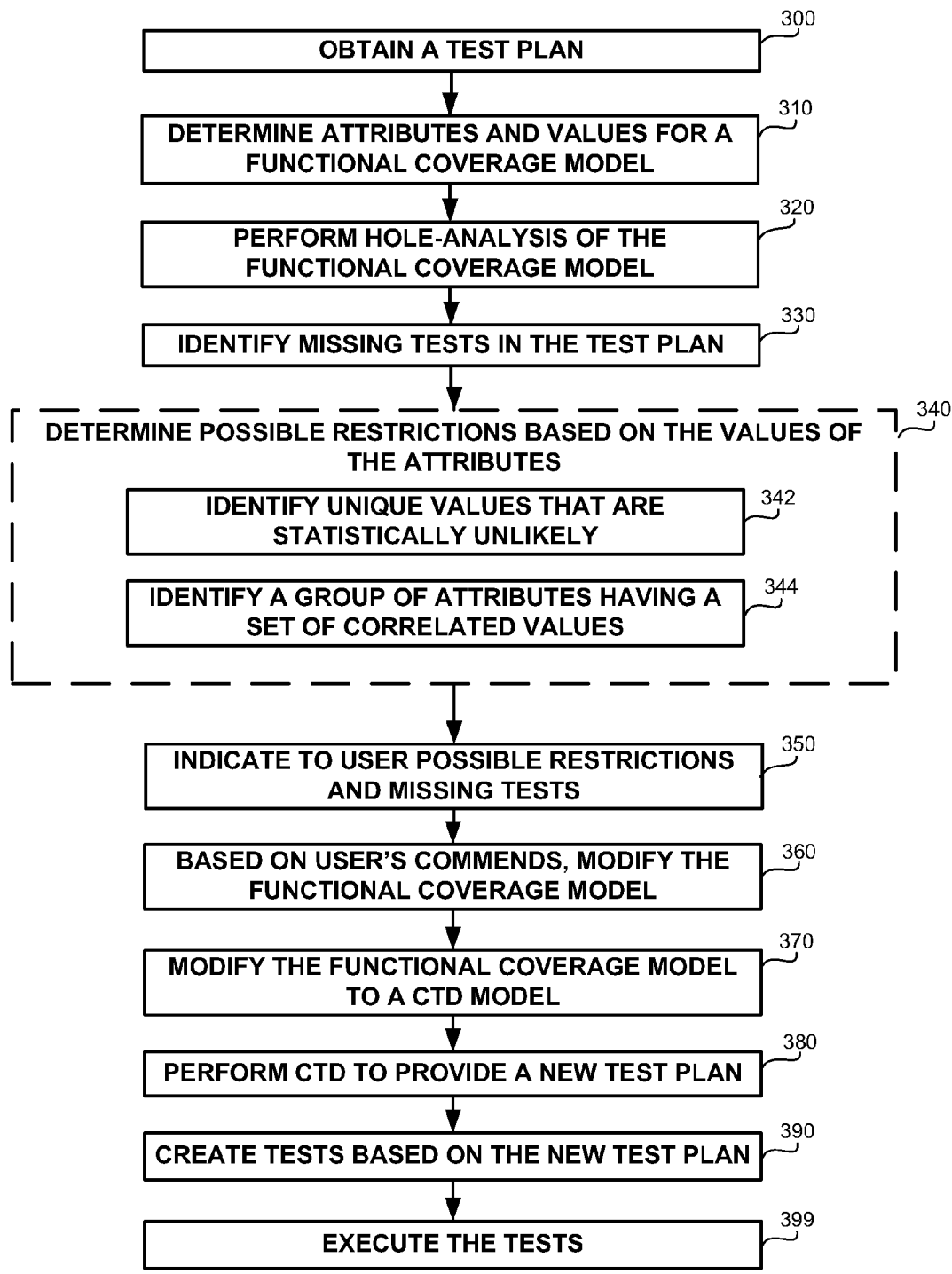
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a first test plan may be obtained. The first test plan may be obtained by a test plan obtainer, such as 210 of FIG. 2.

In step 310, attributes and values for a functional coverage model may be determined based on the test activities defined by the first test plan. The determination may be performed by a coverage model determinator, such as 220 of FIG. 2.

In step 320, hole-analysis may be performed on the test plan in respect to the first test plan. The hole-analysis may be performed to identify uncovered functional attributes and combinations. The hole-analysis may be performed in order to identify holes of predetermined sizes, such as determined by a user, defined by rules and configurations, or the like. The hole-analysis may be performed by a hole-analysis module, such as 235 of FIG. 2.

In step 330, uncovered test requirements may be determined, such as based on the identified holes. The determination may be performed by an uncovered test requirement determinator, such as 230 of FIG. 2.

In step 340, a determination of possible restrictions based on the values of the attributes may be performed. The determination may be performed by a restriction determinator, such as 260 of FIG. 2. The determination may comprise performing steps such as 342 and/or 344.

In step 342, values that are statistically unlikely, such as a unique value out of a substantial amount of test activities, such as one hundred test activities, may be identified. The identification may be performed by a restriction determinator, such as 260 of FIG. 2, which may utilize a statistical significance module, such as 262 of FIG. 2. Repetitive values that are repeated a small amount of times, may also be identified. The identified values may be utilized to determine a restriction, to suggest a restriction to a user or the like.

In step 344, a set of attributes with correlation between their values may be determined For example, a set of attributes in which a single attribute has a one value, such as TRUE, and the other attributes must have a second value, such as FALSE. The correlation between the values of the attributes may be a different correlation, such as having a small portion of the combinatorial combinations between the values of the attributes as valid values. The identification and determination of a restriction based upon such determination may be performed by a restriction determinator, such as 260 of FIG. 2.

In step 350, an indications to a user, such as 120 of FIG. 1, may be performed. The indications may provide the user with information regarding missing tests (i.e., "holes" in the coverage of the functional coverage model). The indications may provide the user with suggestion to add restrictions based on the determination in step 340. In some exemplary embodiments, step 350 may be performed by a confirmation module, such as 264 of FIG. 2.

In step 360, restrictions over the functional coverage model may be determined based on input from the user. Modification to the functional coverage model may be performed, such as by unifying a set of attributes, removing a descriptive attribute or the like. The modifications may be performed in response to a user's input. In some exemplary embodiments, the modifications may be performed without user's intervention. In some exemplary embodiments, the user may elect whether to verify the suggested modifications or accept the suggestions without inspecting their content. The modification to the functional coverage model may be performed by a FCMM, such as 250 of FIG. 2.

In step 370, the functional coverage model may be transformed into a CTD model. A detailed enabling description of some exemplary embodiments may be found in patent application Ser. No. 12/427,773, filed Apr. 22, 2009, the contents of which were incorporated by reference to the present application. The restrictions determined in step 340 may be utilized to reduce the size of the CTD model. In some exemplary embodiments, only suggested restrictions which were approved by a user may be utilized to reduce the size of the CTD model. Step 370 may be performed by a test plan creator, such as 240 of FIG. 2.

In step 380, CTD may be performed based on the CTD model to produce a second test plan. The second test plan may comply with the restrictions determined in step 340. The second test plan may comply with the functional coverage model (modified or not-modified) determined during the method of FIG. 3. In some exemplary embodiments, the second test plan may comprise the first test plan and an incremental addition thereto, generated by a CTD module, such as 245 of FIG. 2. In some exemplary embodiments, the second test plan may be generated from scratch by the CTD module.

In step 390, tests may be written, designed, generated or otherwise created based on the new test plan. In some exemplary embodiments, tests may be created in respect to the incremental addition over the first test plan, as there may already be tests that comply with the first test plan. The creation of tests may be performed manually, by a user, or automatically be a generation tool.

In step 399, the tests may be executed. Coverage of the tests may be determined and compared to that expected based on the second test plan.

In some exemplary embodiments of the disclosed subject matter, a test plan design tool, such as 200 of FIG. 2, may be configured to provide an second test plan having at least the same coverage as the first test plan. A test plan creator, such as 240 of FIG. 2, comprising a CTD module, may be configured to generate a second test plan based on the functional coverage model determined by a coverage model determinator, such as 220 of FIG. 2. The CTD module may be instructed, by a user or by predetermined configurations or the like, to generate the second test plan and fulfill coverage goals achieved by the first test plan. For example, each pair of attributes covered by the first test plan may be defined as a coverage goal to be covered by the second test plan. Other coverage goals may be examined, such as sets of attributes of predetermined size, sets of attributes selected from a portion of the attributes or the like. In some exemplary embodiments, the CTD module may provide a second test plan having a same or better coverage than the first test plan using a lower number of test requirements.

In some exemplary embodiments, a coverage goal covered by the second test plan and not covered by the first test plan may be utilized by a restriction determinator, such as 260 of FIG. 2, as a basis for a restriction. A test plan comparator (not shown) may be configured to compare the second test plan and the first test plan and to provide a set of coverage goals covered by the second test plan and not covered by the first test plan. A coverage goal may be any portion of a test requirement. As the second test plan is generated, in case some restrictions on the coverage model were not introduced, illegal test requirements may be generated. By comparing the two test plans for differences, additional restrictions may be identified. Any coverage goal that may be suspected as being restricted may be suggested to the user. The user may confirm a suggested restriction. It will be noted that a method in accordance with the disclosed subject matter may include a repetitive procedure of generating the second test plan, comparing the two test plans, suggesting a restriction, and adding a restriction based on user input. Such repetitive procedure may be performed a plurality of times until, for example, no additional restrictions are introduced. Comparing the first and second test plans may be performed in an exemplary embodiment in which the uncovered test requirement determinator, such as 230 of FIG. 2, is or is not utilized.

The disclosed subject matter provides a plurality of possible manners in which requirements may be identified, such as by comparing the first and second test plans, by identifying uncovered test requirements in the first test plan, by identifying a relation between attributes of the coverage model and the like. Some or all of the different manners may be utilized in some exemplary embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that is can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a test plan, wherein the method is performed by a processor, the method comprising:
    obtaining a first test plan comprising a plurality of test requirements in respect to functional attributes of at least one test;
    determining a coverage model based on the first test plan;
    determining at least one uncovered characteristic based on the coverage model;
    based on the at least one uncovered characteristic, determining at least one restriction in respect to the coverage model;
    determining a second test plan in accordance with the coverage model and based on the at least one restriction, wherein the second test plan is determined without executing tests in accordance with the first test plan, and
    whereby the first test plan is transformed to the second test plan.

2. The method of claim 1, wherein said determining at least one uncovered characteristic comprises performing hole-analysis on the first test plan in respect to the coverage model.

3. The method of claim 1 further comprising creating one or more tests based on to the second test plan.

4. The method of claim 3, wherein said creating one or more tests comprises manually writing the one or more tests.

5. The method of claim 1, wherein said determining at least one restriction is performed based on an input from a user.

6. The method of claim 5, further comprising providing the user with an indication of the uncovered characteristic.

7. The method of claim 1, wherein said determining the second test plan comprises generating a new test plan using a combinatorial test design based on the coverage model.

8. The method of claim 1, wherein said determining the second test plan comprises:
generating a third test plan using the combinatorial test design, the third test plan is configured to cover at least coverage tasks of the coverage model that are not covered by the first test plan; and
adding the first test plan to the third test plan to provide the second test plan.

9. The method of claim 1, wherein the first and second test plans are test plans of a computer program.

10. The method of claim 1 further comprises storing the second test plan in a storage device.

11. The method of claim 1 further comprises modifying the coverage model based on predetermined rules.

12. The method of claim 11, wherein said modifying the coverage model comprises:
determining a modification based on the predetermined rules;
providing an indication of the modification to a user; and
in response to a confirmation from a user, performing the modification.

13. The method of claim 1, wherein said determining at least one restriction in respect to the coverage model comprises:
identifying a set of attributes of the coverage model having a relatively small number of combinations of values in the first test plan; and
determining the at least one restriction excluding invalid values of the set of attributes.

14. The method of claim 13, wherein the at least one restriction comprises a combination of values to the set of attributes appearing in the first test plan a relatively small number of times.

15. The method of claim 14, wherein the relatively small number of times in which the combination of values appear in the first test plan are statistically significant in respect to the first test plan.

16. A computerized apparatus for generating a test plan, the computerized apparatus having a processor; the computerized apparatus comprising:
a test plan obtainer configured to obtain a first test plan, wherein the first test plan comprises a plurality of test requirements in respect to an attribute of at least one test;
a coverage model determinator configured to determine a coverage model based on the first test plan;
an uncovered test requirement determinator configured to determine an uncovered test requirement based on the coverage model;
a restriction determinator configured to determine an at least one restriction in respect to the functional coverage model based on the uncovered test requirement; and
a test plan creator configured to determine a second test plan based on the coverage model and based on the at least one restriction determined by said restriction determinator,
wherein the second test plan is determined without executing tests in accordance with the first test plan.

17. The computerized apparatus of claim 16, wherein said uncovered test requirement determinator comprises a hole-analysis module.

18. The computerized apparatus of claim 16, wherein said test plan creator comprises a combinatorial test design module configured to determine the second test plan.

19. The computerized apparatus of claim 16, wherein said test plan creator is further configured to generate one or more tests based on the second test plan.

20. The computerized apparatus of claim 16, wherein said restriction determinator comprises a statistical significance module.

21. The computerized apparatus of claim 16, wherein said restriction determinator is responsive to a user indication regarding the restriction.

22. The computerized apparatus of claim 21,
wherein the user indication is associated with a coverage task; and
wherein the user indication is selected from the group consisting of an indication to cover the coverage task, an indication to exclude the coverage task, and a don't care indication regarding the coverage task.

23. The computerized apparatus of claim 16 further comprises a coverage model modifier configured to modify the coverage model;
wherein said coverage model modifier is configured to replace a first set of attributes with a second set of attributes; and
wherein the second set of attributes consists of less attributes than the first set of attributes.

24. A method for generating a test plan, wherein the method is performed by a processor, the method comprising:
obtaining a first test plan comprising a plurality of test requirements in respect to functional attributes of at least one test;
determining a coverage model based on the first test plan;
determining a coverage goals covered by the first test plan in respect to the coverage model;
generating a second test plan based upon the coverage model,
wherein said generating is performed using a Combinatorial Test Design (CTD) method;
the second test plan is configured to cover at least the coverage goals;
determining at least one coverage goal covered by the second test plan and not covered by the first test plan;
defining at least one restriction based upon the at least one coverage goal;
generating a third test plan based upon the coverage model and the restriction,
wherein the second test plan is determined without executing tests in accordance with the first test plan; and
whereby the first test plan is transformed to the third test plan.

25. A computer program product for generating a test plan, the product comprising:
a non-transitory computer readable medium;
a first program instruction for obtaining a first test plan comprising a plurality of test requirements in respect to functional attributes of at least one test;

a second program instruction for determining a coverage model based on the first test plan;
a third program instruction for determining at least one uncovered characteristic based on the coverage model;
a fourth program instruction for determining at least one restriction in respect to the coverage model based on the at least one uncovered characteristic;
a fifth program instruction for determining a second test plan in accordance with the coverage model and based on the at least one restriction, wherein the second test plan is determined without executing tests in accordance with the first test plan, and wherein said first, second, third, fourth and fifth program instructions are stored on said non-transitory computer readable medium.

* * * * *